US008666543B2

(12) United States Patent
MacVittie et al.

(10) Patent No.: US 8,666,543 B2
(45) Date of Patent: Mar. 4, 2014

(54) INTELLIGENT DISPENSER

(75) Inventors: David MacVittie, Malibu, CA (US); William F. King, IV, San Francisco, CA (US)

(73) Assignee: DoseSmart, Inc., Bethesda, MD (US)

( * ) Notice: Subject to any disclaimer, the term of this patent is extended or adjusted under 35 U.S.C. 154(b) by 186 days.

(21) Appl. No.: 13/196,222

(22) Filed: Aug. 2, 2011

(65) Prior Publication Data

US 2013/0035785 A1 Feb. 7, 2013

(51) Int. Cl.
*G06F 17/00* (2006.01)

(52) U.S. Cl.
USPC ............ 700/242; 221/241; 700/236; 700/237

(58) Field of Classification Search
USPC .................................. 221/241; 700/236, 242
See application file for complete search history.

(56) References Cited

U.S. PATENT DOCUMENTS

| | | | | |
|---|---|---|---|---|
| 3,437,236 | A | 4/1969 | Huck | |
| 4,460,106 | A * | 7/1984 | Moulding et al. | 221/1 |
| 5,259,532 | A * | 11/1993 | Schwarzli | 221/304 |
| 6,098,835 | A | 8/2000 | DeJonge | |
| 6,332,100 | B1 * | 12/2001 | Sahai et al. | 700/242 |
| 6,343,711 | B1 * | 2/2002 | Coughlin | 221/217 |
| 6,651,840 | B1 | 11/2003 | Van Dullemen et al. | |
| 2006/0213917 | A1 * | 9/2006 | Handfield et al. | 700/244 |

* cited by examiner

*Primary Examiner* — Timothy Waggoner

(74) *Attorney, Agent, or Firm* — Fitzpatrick, Cella, Harper & Scinto

(57) ABSTRACT

A pill dispenser for dispensing pills of various sizes includes a pill storage section, a dispensing section located at a lower end of the storage section, an optical sensor, a memory and a controller. The dispensing section includes a device for adjusting a variable size cavity configured to adjust to various pill sizes. The controller adjusts the variable size cavity of the dispensing section depending on the individual pill specifications, and determines if the optical sensor has sensed presence of the pill to be dispensed.

17 Claims, 9 Drawing Sheets

INTELLIGENT DISPENSER

BACKGROUND OF THE INVENTION

The present invention relates to dispensers configured to remind a user and dispense medication to a user, and, more particularly, to devices, methods and systems for tracking medication compliance.

Medication non-compliance is a major problem in health care. Medications in the form of pills, capsules, gel-caps, pellets, tablets, etc., are typically provided to a user in a disposable plastic container with a cap, such as a childproof cap. When physicians prescribe medications, they typically advise the patients of a proper medication administration, such as to take the medication at appropriate times in appropriate quantities, to continue taking the medication for the full prescribed regimen, even if the patient feels better, etc. Unfortunately, many patients exhibit poor compliance in properly following the regimens set out by their physicians.

A variety of products and techniques for reminding patients to take their medications, as prescribed, are known. Some compliance intervention systems offered by health care providers are designed to remind the patient to take the medication and alert a remote caregiver if the patient does not comply with taking the medication as prescribed. Some of these compliance intervention systems include sensors/reminders in the home, a network connection, and outbound messaging to a caregiver or even back to the patient.

Various attempts have been made to try to increase and improve the compliance of patients in the taking of their medications. Most of these systems are reminder systems. For example, there are a large number of pillbox systems that marry alarm clocks to medication containers to remind patients when it is time to take their medications.

U.S. Patent Application Publication No. 2007/0016443 A1, for example, describes a method of providing a feedback scheme for medication to determine if a patient is complying with a specific schedule for the medication. This is accomplished by applying a special cap to a regular pill container. A sensor senses when the cap is opened and closed. A weight sensor may be provided to determine how many pills have been removed from the container. Further, the patent application publication describes the use of a pillbox with several compartments for storing pills. The device as described has no way to determine if the correct pills are being dispensed.

U.S. Pat. No. 7,359,765 B2, as another example, describes an electronic pill dispenser which has a container for storing pills with a pill dispensing tray located on the bottom of the container. The container has a pill dispensing mechanism with a rotary wheel connected to two recesses diametrically opposed to each other. The recesses allow the pill to travel through as it is being dispensed. The recesses may be adjustable to dispense a pill of a particular size. Once the pill container has been set to allow pills of a certain size to be dispensed, the pill container may not again be adjusted to adapt to pills of different sizes.

The present invention improves prior systems and overcomes the prior systems' deficiencies.

SUMMARY OF THE INVENTION

A system, method and apparatus are disclosed for a pill dispenser which is able to dispense a single pill at a time and determine that a pill is being dispensed to the user. The system, method and apparatus are also capable of determining the compliance of a user with the prescribed method of consumption of the pill from a doctor or health care provider.

In one aspect of the present invention, an apparatus for dispensing pills of various sizes includes a storage section, a dispensing section, a controller, and a sensor. The storage section is for storing pills to be dispensed and the dispensing section is connected to the storage section to dispense pills stored in the storage section through an outlet. The dispensing section includes an adjusting device to adjust a variable size cavity for receiving from the storage section a pill to be dispensed and an ejecting device for ejecting the pill from the variable size cavity. The controller controls the dispensing section and the sensor detects the pill to be dispensed and communicates with the controller. The controller controls the adjusting device to adjust a size of the variable size cavity according to a size of the pill to be dispensed, controls the ejecting device to eject the pill from the variable size cavity, and receives a signal from the sensor when the pill has been successfully ejected from the variable size cavity.

In another aspect of the present invention, a method of operating a pill dispenser includes the steps of determining if an elapsed time is at least equal to a predetermined time period; alerting a user when the elapsed time is at least equal to the predetermined time period; determining whether the user has actuated the dispenser to release a pill from the pill dispenser; releasing the pill from the pill dispenser if the dispenser has been activated. The releasing step comprises positioning a pill to be dispensed in a dispensing cavity defined by a sizing ring, a dispensing ring and a depth ring set to a size of a specific pill, moving the dispensing ring relative to the sizing ring and the depth ring to move a single pill, and determining by a sensor that the pill has been dispensed.

The present invention ensures that a pill is being dispensed to a user by first calibrating the internal components to a specific pill size and then determining that the pill has been dispensed. Further, the present invention is capable of determining the color and/or an indicia embossed or imprinted on the pill. Accordingly, the present invention is capable of not only detecting when a pill has been dispensed, but also whether a correct pill has been dispensed via the color and/or indicia embossed or imprinted on a pill, and of alerting a user if an incorrect pill is dispensed.

DETAILED DESCRIPTION OF THE PREFERRED EMBODIMENTS

The present invention relates to an apparatus, method and system for using an intelligent dispenser to dispense medicine to a patient and monitor its intake. In a preferred embodiment, the dispensed medicine is in the form of pills. The term "pills," as used herein, refers to any of capsules, gel-caps, pellets, tablets, or the like, in any particular shape or size. However, as would be understood by one of ordinary skill in the art, the present invention is not limited to only dispensing medicine, but may be used to dispense any suitable items, especially those in which compliance is monitored and those of a specific, uniform size.

Figure 1:
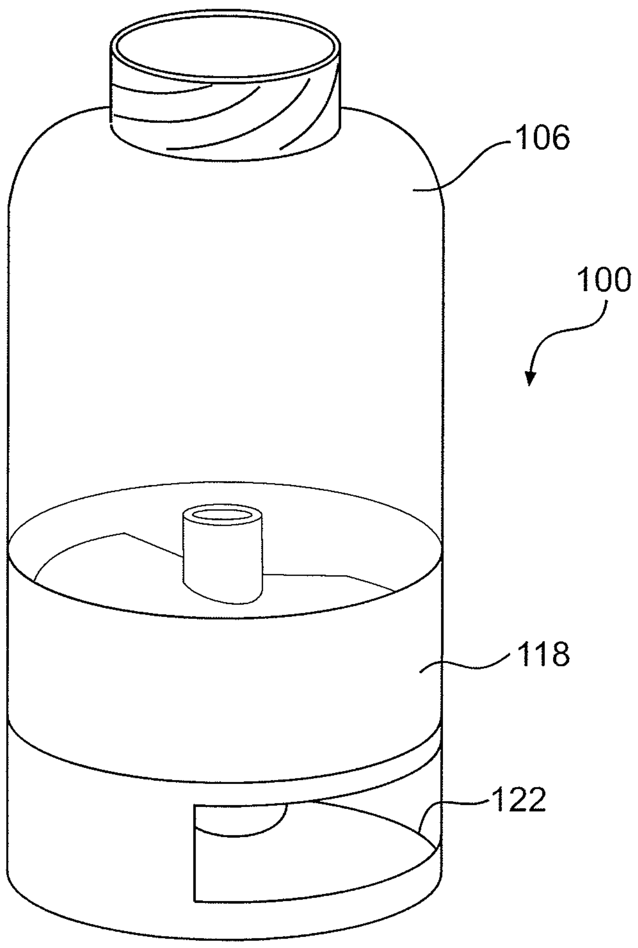
FIG. 1 is a perspective, transparent view of a dispenser of a first embodiment of the present invention.
Figure 2:
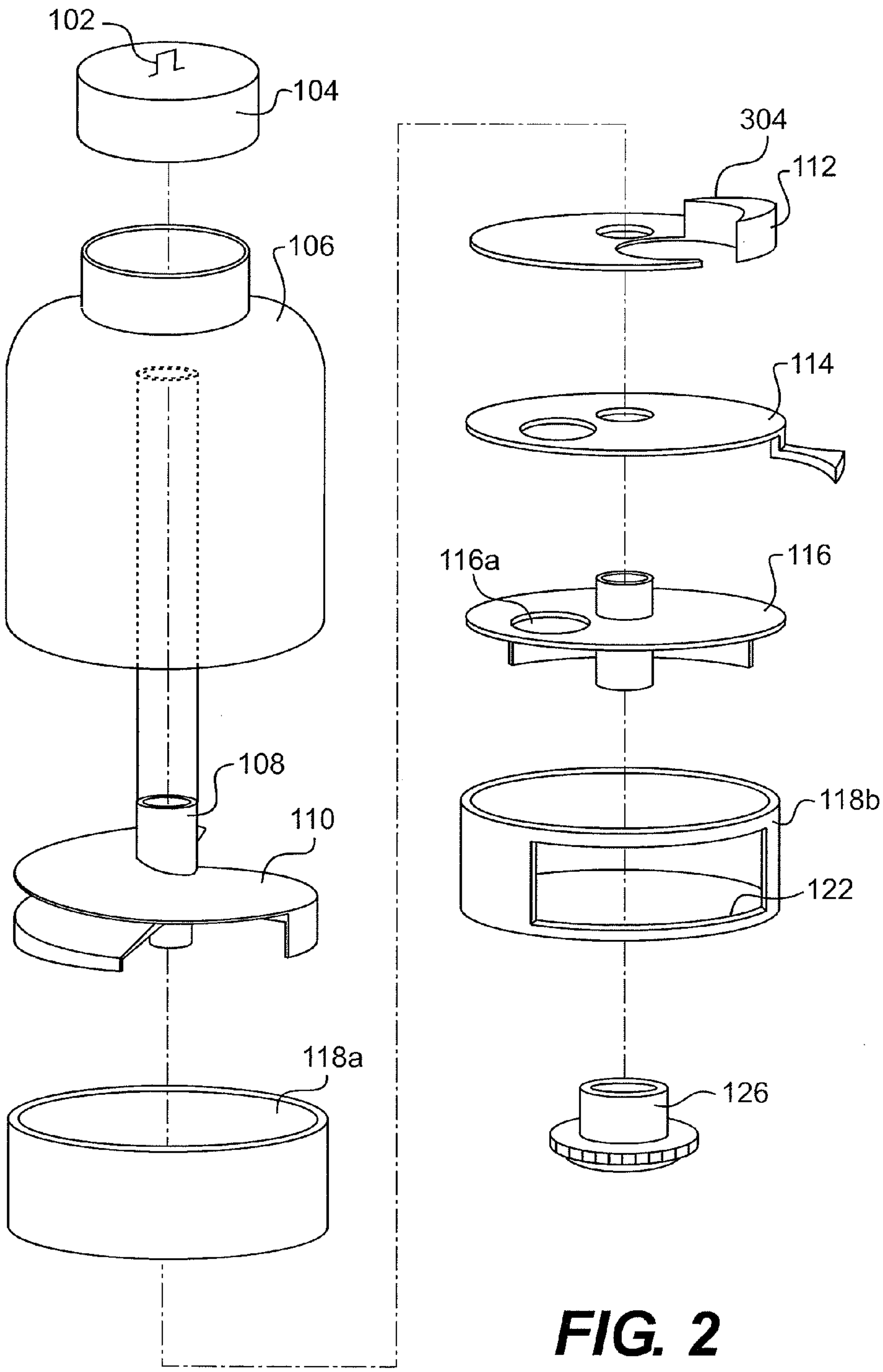
FIG. 2 is an exploded, perspective view of the internal features of the first embodiment of the present invention.

In a preferred embodiment, as shown in FIGS. 1 and 2, a pill dispenser 100 is a device which distributes appropriate pills to a user. The pill dispenser 100 has a container 106 attached to a dispensing section 118. The pills are stored in container 106 until they are dispensed. The pill dispenser includes an elongated shaft 108 positioned through the container 106 and the dispensing section 118. A removable top portion 104, with a button 102, is provided to close an opening at the top of the container 106. The dispensing section 118 includes an upper casing 118*a* and a lower casing 118*b*. The upper casing 118*a* includes a dispensing assembly 120, shown in more detail in FIGS. 1-6, which further includes a helix 110, sizing ring 112, dispensing ring 114, and depth ring 116. The lower casing 118*b* includes a dispensing opening or outlet 122, a gear 126, and a sensor 306.

The pill dispenser 100 may be any desired shape and size. Preferably, the pill dispenser is cylindrical and approximately 3½" to 4" tall. This allows the pill dispenser 100 to be about the average size and shape of traditional pill containers provided by a pharmacy. Located in the lower casing 118*b* of dispensing section 118 is the opening 122, through which the user can retrieve a pill. When the pill is dispensed, which will be discussed below, the user may tip the pill dispenser 100 to retrieve the pill from the opening 122 in the lower casing 118*b*.

FIG. 2 depicts an exploded view of the pill dispenser 100. The button 102 is located on the removable top portion 104. When the button 102 is depressed by a user, the pill dispenser 100 dispenses a pill, as will be discussed further below. The removable top portion 104 may be a screw on cap or pop on/off cap, for example. Other configurations of the removable top portion 104 would be obvious to one having ordinary skill in the art and will not be described further. The removable top portion 104 connects to the container 106 and the elongated shaft 108 located inside the pill dispenser 100. The removable top portion 104 and the elongated shaft 108 will have electrical connections that allow the button 102 located on the removable top portion 104 to communicate with other components of the pill dispenser in order to dispense a pill when the button 102 is depressed. By way of the electrical connection with the elongated shaft 108, the pill dispenser 100 is able to detect via a processing unit 402, shown in FIG. 3, when the removable top portion 104 has been removed by a user.

Figure 4:
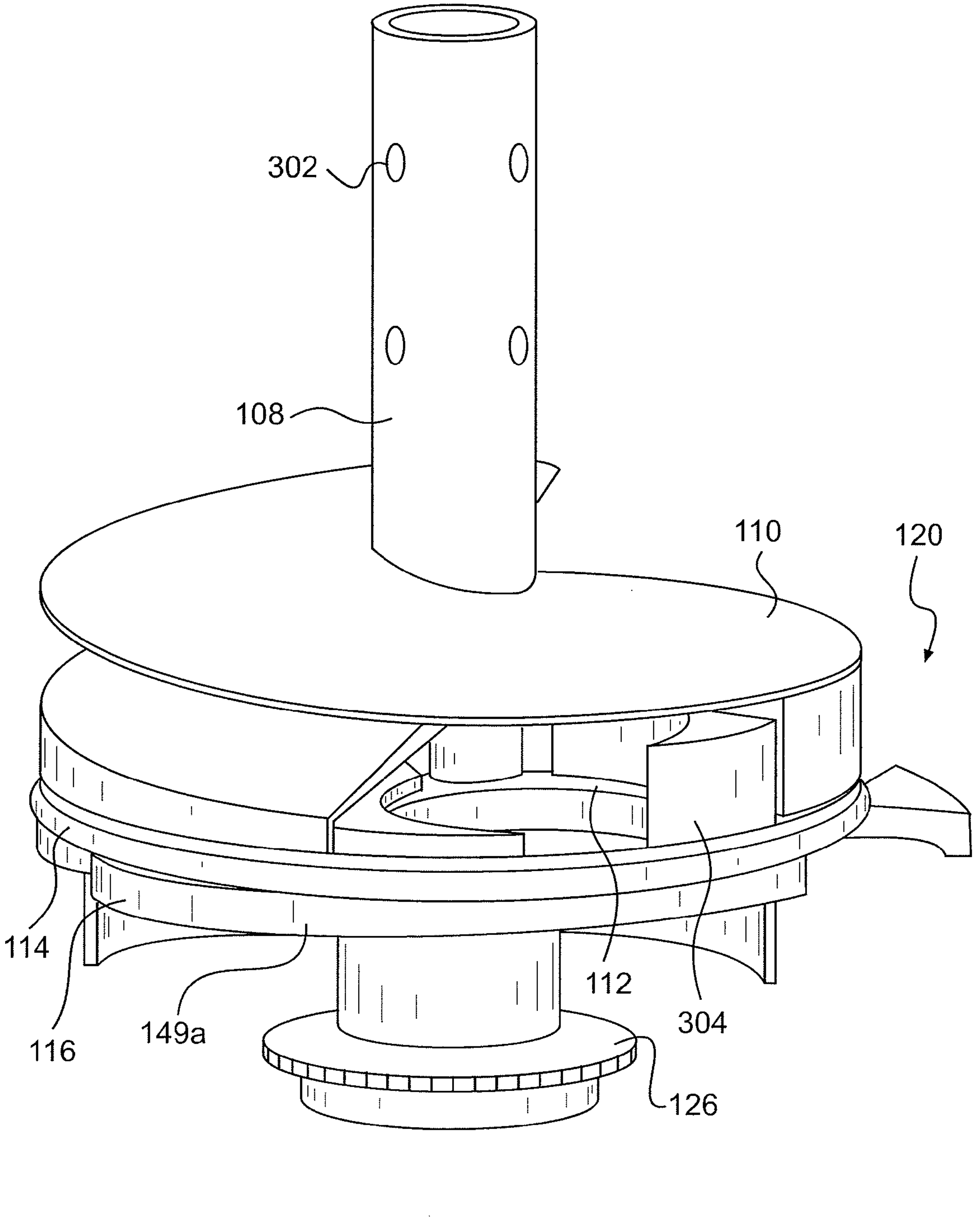
FIG. 4 is an enlarged perspective view of a pill dispensing assembly of the first embodiment of the present invention.
Figure 5:
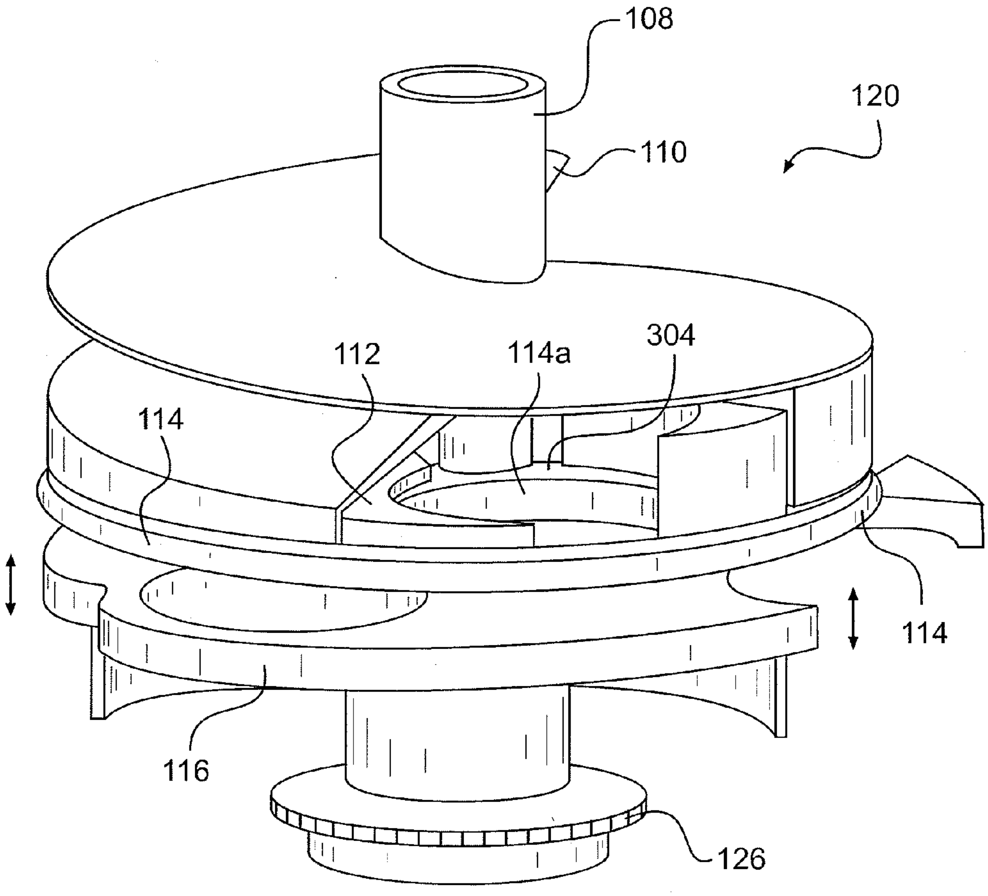
FIG. 5 is an enlarged perspective view of the pill dispensing assembly of the first embodiment of the present invention, showing a state in which the depth ring is adjusted.

FIG. 4 shows an enlarged view of the elongated shaft 108 and the pill dispenser assembly 120. The pill dispenser assembly 120 includes the helix 110, sizing ring 112, dispensing ring 114, and depth ring 116 in the listed order, from highest to lowest 110-116. The helix 110, sizing ring 112, dispensing ring 114 and depth ring 116 are centered on shaft 108 and are either affixed to or movable relative to the shaft 108. The operation of the pill dispenser assembly 120 will be discussed more fully below. The pill dispenser assembly 120 is located at least partially in the upper casing 118*a* of the dispensing section 118. The sizing ring 112 is preferably a C-shaped ring fixed to shaft 108. Preferably, the opening of the C-shape is based on the size of the pill to be dispensed. The opening preferably is anywhere between 1 mm and 24 mm. In a preferred embodiment, the sizing ring 112 has an opening wide enough to accommodate a pill between the size of 6 mm to 16 mm. However, the pill dispenser 100 is not limited to dispensing these sizes and may have a sizing ring 112 that can accommodate pills smaller than 5 mm and larger than 16 mm.

Figure 3:
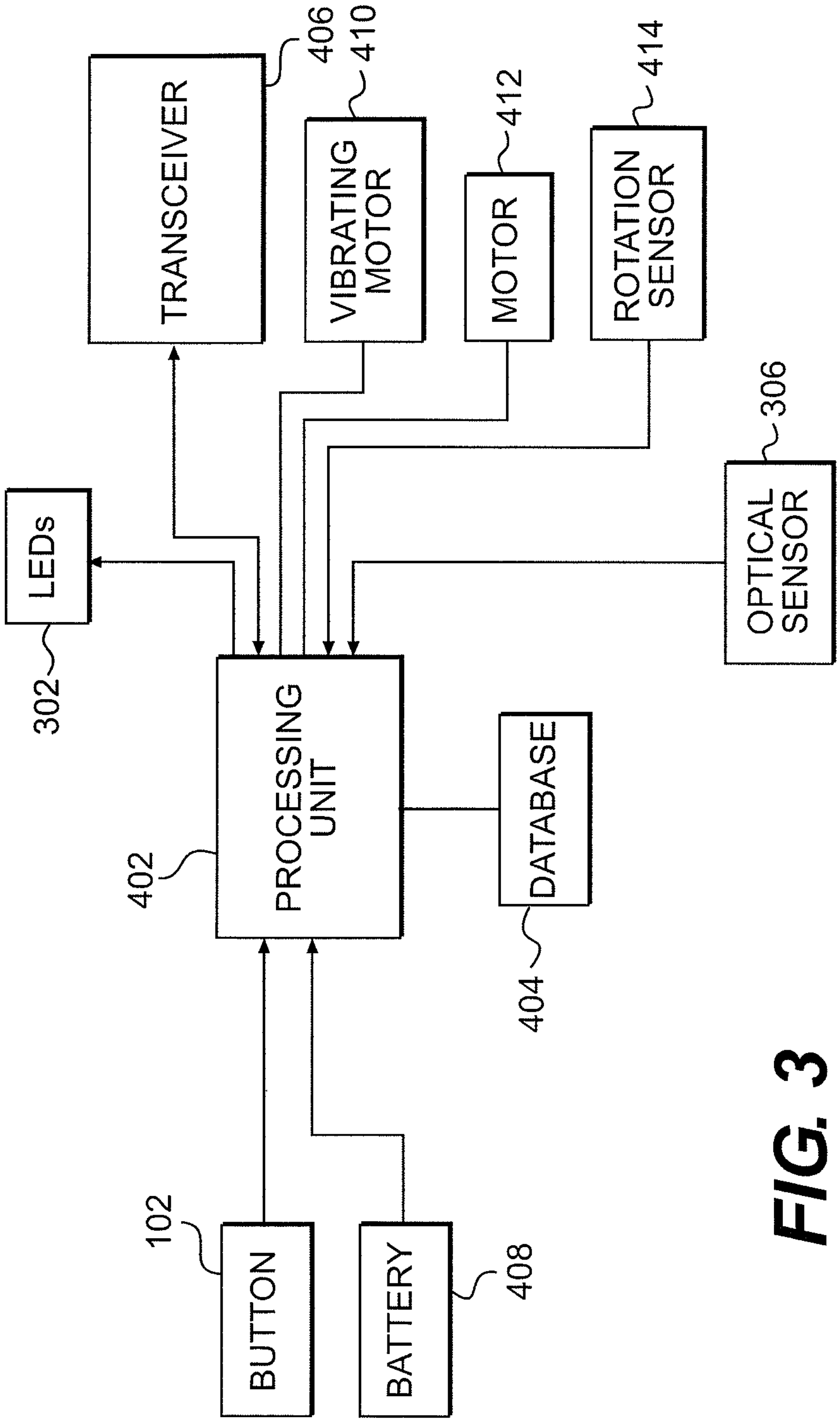
FIG. 3 is a block diagram showing the electrical components of the first embodiment of the present invention.

As shown in FIG. 4, the sizing ring 112 has a protrusion 304 configured to provide a stop for the pills moving down the helix 110, as discussed more fully below. The dispensing ring 114 is rotatable around the shaft 108 relative to sizing ring 112. Dispensing ring 114 has an opening 114*a* which cooperates with protrusion 304 of sizing ring 112 and can be partially covered by the sizing ring. The dispensing ring 114 is driven by a motor 412, as shown in FIG. 3. Motor 412 can be a stepping motor, for example, and the motive force can be transmitted to the dispensing ring by any known mechanism. The motor is capable of rotating the dispensing ring 114 in both directions. The opening 114*a* of the dispensing ring 114 forms sides of a variable size cavity along with sizing ring 112. A pill received in the cavity can be pushed by the dispensing ring 114 to an opening 116*a* in the depth ring 116, which is centered on shaft 108 and cannot rotate, but can move vertically.

Figure 6:
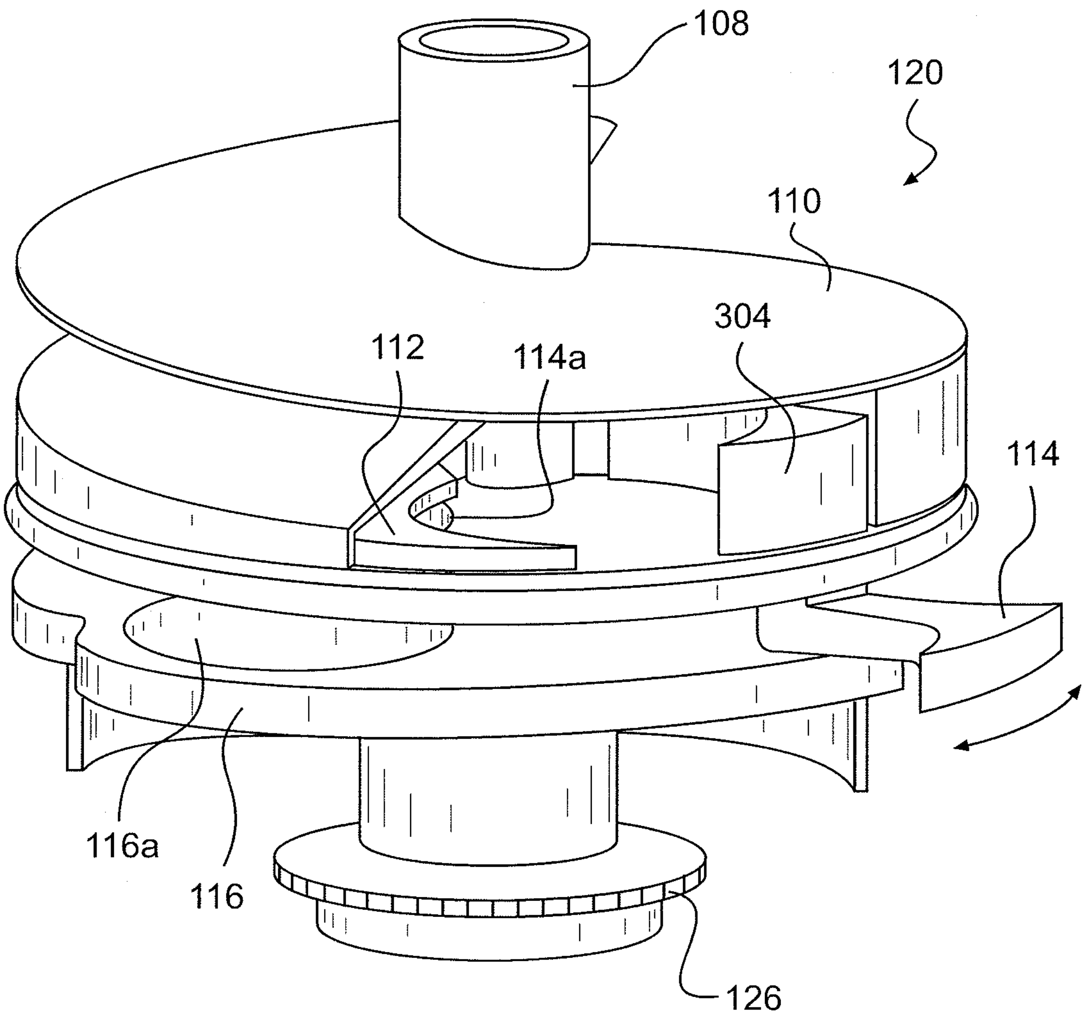
FIG. 6 is an enlarged perspective view of the pill dispensing assembly of the first embodiment of the present invention, showing movement of the dispensing ring.

In the second casing 118*b* of the dispensing section 118, the gear 126 is attached to a center axis of the depth ring 116. When the gear 126 is rotated by the motor 412, shown in FIG. 3, the depth ring 116 moves in an upward or downward direction via a threaded shaft (not shown) in lower casing 118*b*. As will be understood by one of ordinary skill in the art, the depth ring 116 may be moved upwards or downwards by a screw-like configuration. The depth ring 116 consists of a ring and a shaft portion which fits over the elongated shaft 108. The depth ring 116 is moved relative to the elongated shaft 108 to move upwards or downwards. As shown in FIG. 2 and FIG. 6, the depth ring 116 has an opening 116*a* which allows a pill to be dispensed. The operation of the pill dispenser assembly 120 will be discussed more fully below. In another embodiment, a number of pill dispensers 100 may be manufactured to have the their depth rings fixed at a variety of different positions. Then, a specific pill dispenser 100 can be chosen based on the needed height of a depth ring 116 instead of calibrating the depth ring 116 every time a pharmacist fills the pill dispenser 100 with differently-sized medication.

The elongated shaft 108 may also have LEDs 302 placed thereon, as shown in FIGS. 3 and 4. The LEDs may be illuminated in order to alert a user when it is time to take his or her medication, as will be discussed more fully below. Placing LEDs 302 within the container would only be effective if the container is clear or translucent. As would be understood by one having ordinary skill in the art, multiple color LEDs may be used. Further, the location of the LEDs is not limited to the shaft 108. The LEDs may be placed at any location in order to alert a user.

Although the casing of dispensing section 118 is shown in two parts 118*a*, 118*b* in FIG. 2, one of ordinary skill in the art would understand that the casing may be made as a single part or multiple parts. Preferably, in the lower casing 118*b*, below the depth ring 116, the optical sensor 306 is located to detect the presence of a pill. However, the optical sensor 306 may also be placed inside the variable size cavity to detect the presence of the pill. Alternatively, or in addition to determining the presence of a pill, the optical sensor 306 can determine the color of the pill, the shape of the pill, or any indicia imprinted or embossed on the pill. Optical recognition technology is known to those skilled in the art and will not be discussed in detail herein. Further, multiple optical sensors 306 may be used. One optical sensor 306 may be placed in the variable size cavity and another may be placed in the lower casing 118*b*. Further, a single optical sensor may be used, along with a reflection system, to detect the pill in the variable size cavity and the lower casing 118*b*, as would be understood by one of ordinary skill in the art.

In an alternative embodiment, one or more optical sensors may be placed in the container 106. These optical sensors would be able to send a signal to the processing unit 402 in order to determine the level of the pills in the container. Then, as discussed more fully below, the pill dispenser 100 can send signals to a device located outside the pill dispenser 100 to provide information on the level of the pills.

As discussed above, an alert device will be provided in the pill dispenser 100 in order to alert a user of the time to take the medication or of errors in the system. The alert device may be an audio alarm, a visual alarm or a vibration alarm. The visual alarm, shown in FIGS. 3 and 4, may be the light emitting devices (LEDs) 302. For example, one of the LEDs glows green when the user is to take a pill and another glows red when it is not yet time for the user to take a pill. The audio alarm (not shown) will emit an audible signal when it is time for a user to take a pill and the vibrating alarm (not shown) will vibrate the pill dispenser 100 when it is time for the user to take a pill. The drive source for the vibrating alarm can be the same motor used to vibrate the helical ramp, discussed below.

The visual alarm may be a flashing light or may be a steady light. Further, the audio alarm may emit sound in a pattern, may emit a steady sound or may be an automated voice. Further, the pill dispenser 100 is not limited to a single type of alert device. The pill dispenser 100 may contain all three types of alarms, any combination of the three types of alarms, or other alerting devices not discussed herein.

The alarms in the pill dispenser 100 are not only for alerting a user when to take medication, but can also alert the user if there is a system malfunction. For example, if a pill gets jammed, the pill dispenser 100 could emit an audio alarm with a sound that differs from the audio alarm sound used to indicate it is time to take medication. Also, the pill dispenser 100 could emit a different color LED 302 if there is a system malfunction.

The LEDs 302 may also be used to alert the user to what type of medication is in the pill dispenser. As an example, if a user is taking a variety of pills, a pill dispenser 100 for heart medication could glow red, and a pill dispenser 100 for diabetes medication could glow blue.

The calibration of the pill dispenser 100 will be discussed below.

The pill dispenser 100 is first filled and calibrated at a pharmacy by a pharmacist. The pill dispenser 100 is connected to a pharmacy computer system either by wired or wireless means. The pharmacist enters which type of pill is to be filled in the pill dispenser 100. The pharmacy computer system contains a database of all drug specifications. The pharmacy computer system sends the drug size, type, dose, dispensing time and other critical information to the device in order to calibrate the device. The pharmacy computer system also transmits the patient specific information, along with health care provider and pharmacy information, as required by relevant regulations.

Once the patient information and the specific drug information are uploaded to the pill dispenser 100, the pill dispenser 100 automatically calibrates to a pill size according to the specific pill information transmitted. During calibration, the processing unit 402, shown in FIG. 3, determines the size of the pill from the database 404. Then, a rest position of the dispensing ring 114 will be adjusted relative to the sizing ring 112 to create an opening to accommodate the length or diameter dimension of the specified pill. Therefore, as shown in FIG. 4, the smaller the pill, the further the dispensing ring 114 opening will be rotated to the right to establish its rest position. In that figure, the dispensing ring 114 has been rotated to the right so that part of the opening in the dispensing ring 114 is shortened by protrusion 304 of the sizing ring 112. That is, the far left side of the opening of the dispensing ring 114 is moved closer to the protrusion 304 of the sizing ring 112. The sizing ring 112 is stationary to allow the protrusion 304 to also act as a backstop, which will be discussed more fully below. Thus, the distance between the protrusion 304 and the left edge of opening 114*a* defines the dimension of the variable size cavity that corresponds to the length or diameter of the pill.

Once the dispensing ring 114 is adjusted to the correct pill length or diameter, the depth ring 116 is adjusted in a vertical manner. The gear 126 is actuated by an unshown drive gear driven by motor 412 to adjust the height of the depth ring 116. The depth ring 116 will adjust in a downward or upward motion to calibrate to the height dimension of the pill as specified in the pill database. The thicker the pill, the lower the depth ring 116 will be positioned. The depth ring 116 will only be moved down far enough so that the top of the pill in the variable size cavity will be positioned just below the top surface of the dispensing ring 114. When positioned appropriately, only one pill will be dispensed and not jam against the sizing ring 112, allowing the pill to fall completely through the opening 114*a* of the dispensing ring 114.

The depth ring 116 contains an opening 116*a*, shown in FIG. 6, through which the pill will pass when the pill is being dispensed, as discussed more fully below. The optical sensor 306 is placed preferably near the depth ring 116, as discussed above. The optical sensor 306, shown schematically in FIG. 3, detects whether a pill has passed through the opening 116*a*, and, if so, the processing unit 402 then determines that the pill has been dispensed. In another embodiment, the optical sensor can detect the color of the pill, the shape of the pill, and/or any indicia embossed or imprinted on the pill using known image recognition technology. The optical sensor 306 will then send the detected color, shape, and/or indicia to the processing unit 402 to determine if the correct pill is being dispensed, as will be discussed more fully below in the operation of the pill dispenser 100. The optical sensor 306 may also be configured to determine if a pill is broken and/or cracked. As would be understood by one having ordinary skill in the art, the pill dispenser 100 would store in the database 404 or a memory in the processing unit 402 the shape of the pill. Then, the optical sensor 306 would be able to detect if the pill is a different shape than that stored in the database 404 or in the memory.

Once the pill dispenser 100 is calibrated for the correct pill size, the pharmacist can fill the pill dispenser 100. Then, the pharmacist computing system switches the pill dispenser 100 into a "sleep mode." The pill dispenser 100 can be programmed to go into one of two modes:

1. A patient can decide when to take the first pill to begin initiation of a medication cycle, such as once every 24 hours, or three times a day, such as for antibiotics.

2. The pill dispenser 100 will have a suggested time for consumption saved in the database depending on the type of drug prescribed and will initiate an alarm at an appropriate window (such as in the morning).

The operation of the pill dispenser 100 by a user will be discussed below.

When a user wishes to dispense a pill, the user will press the button 102 located in the removable top portion 104. The processing unit 402 will begin a dispensing operation by vibrating the helix 100, which is connected to a vibrating motor 410, shown schematically in FIG. 3. Pills in the container 106 are gravity fed down the helix 110, located in the dispensing section 118, which motion is assisted by the vibration of the helix 110. One of the pills (the leading pill) will drop to the sizing ring 112. The protrusion 304 will help guide the pill to the opening of the dispensing ring 114 by acting as a backstop. Therefore, the pill when coming off the vibrating helix 110 will not be able to overshoot the opening 114*a* of the dispensing ring 114. As discussed above, the rest position of the dispensing ring 114 will be calibrated to adjust relative to the sizing ring 112 depending on the input size of the pill. Then, the pill will drop through the opening 114*a* in the dispensing ring 114 until it rests on top of the depth ring 116. As also discussed above, the depth ring 116 will be adjusted to the appropriate level to allow the top of the pill to be just below the top surface of the dispensing ring 114. Thus, the pill will be positioned in a cavity defined on its sides by protrusion 304 and one side of opening 114*a* of dispensing ring 114, and on its bottom by depth ring 116. The dispensing ring 114 will then be rotated by motor 412 approximately a quarter of a turn to push the pill towards the opening 116*a* in the depth ring 116. A rotation sensor 414, shown schematically in FIG. 3, may be provided in order to signal to the processing unit 402 that the dispensing ring 114 has been rotated. In another embodiment, the optical sensor 306 may be used to determine if a pill is in place for dispensing.

At the opening 116*a*, the optical sensor 306 will detect a pill and the processing unit 402 will then determine that the pill has been dispensed. In another embodiment, the optical sensor 306 may read the color, shape, and/or any indicia embossed or imprinted on the pill and send the information to the processing unit 402. The processing unit 402 will determine if the color, shape, and/or indicia on the pill match the information in the database 404.

The user may then pick up the pill dispenser 100 and tilt the pill dispenser 100 in order to retrieve the pill from the outlet 122 of lower casing 118*b*. When the pill has been detected by the optical sensor 306, the helix 110 stops vibrating and the dispensing ring 114 rotates back to the predetermined rest position which was determined during calibration. Alternatively, the dispensing ring 114 may rotate back immediately to the predetermined rest position after it has fully rotated to the opening 116*a* of the depth ring 116. This location of the opening 116*a* may be stored in the database 404 or in the processing unit 402.

If at any stage in dispensing the pill the pill dispenser 100 determines there is an error, either due to the pill or the system, an alarm can be activated to alert a user. For example, if the incorrect pill is dispensed by either the pharmacist filling the pill dispenser 100 with the incorrect medication or an incorrect pill finding its way into the pill dispenser 100 any other way, such as the user putting an incorrect pill in the pill dispenser 100, the system will be able to determine that the pill is the incorrect pill. First, the pill may not fit through the hole 114*a* when the dispensing ring 114 has been adjusted for the pill size. If the pill is the same width or smaller, it will pass through the hole 114*a* of dispensing ring 114. However, assuming that the incorrect pill is the same width, but a greater depth from the pill that is supposed to be dispensed, the dispensing ring 114 will not be able to push the pill to the opening in the depth ring 116 to be dispensed because the pill will be jammed against the sizing ring 112.

It is also possible though that the incorrect pill could be a smaller width and height than the pill that is supposed to be dispensed. In that scenario, in one embodiment, the optical sensor may provide another check of the type of pill to be dispensed. If the incorrect pill is being dispensed, the alarm will be sounded to let the user know that the incorrect pill is being dispensed and not to take the medication. The alarm, as discussed above, may be an audio, visual, or vibrating alarm. The pill dispenser 100 is also capable of alerting a user via an SMS message, discussed below.

The pill dispenser 100 keeps a timestamp of every type of event in a memory (not shown) of the processing unit 402 or in the database 404. Events can include, for example, a successful dispensing at correct dosage and time; dispensing of incorrect dosage (i.e., an extra pill); successful dispensing at an incorrect time; unsuccessful dispensing; and removing the removable top portion 104. The unsuccessful dispensing can include more detail, such as a jam of any of the parts, an alarm malfunction, dispensing of an incorrect number of pills, modem or network failure, and a cracked or broken pill. When such an event occurs, the processing unit 402 writes into memory the type of event and the time of the event.

As discussed above, the pill dispenser 100 contains a processing unit 402, which includes a memory. Preferably, the processing unit 402 is located at the bottom of the pill dispenser 100. The processing unit is connected to the database 404 which has the pill specifications stored therein. For example, the database 404 will contain the size, shape, pill type, color and any identifying marks located on the pill. The database 404 further contains the dosing requirements for each pill prescribed by a physician. The dosing requirements can include a prescribed dosage and timing.

The pill dispenser 100 also contains a transceiver 406 to send and receive communications regarding user, prescription information, and compliance information. The transceiver may be Zigbee and/or Bluetooth technology, a cell modem, a RFID transmitter, or any other known device for sending and receiving information. Preferably, the pill dispenser 100 contains more than one transceiver 406 for redundancy. For example, the pill dispenser preferably contains a cell modem and Bluetooth and/or Zigbee technology.

The cell modem will allow the processing unit 402 to send messages, such as SMS text messages, to a central server so as to report compliance data of a user, any malfunctions, or any misuse of the pills that is sensed by the pill dispenser 100. The Bluetooth or Zigbee technology allows for the device to be able to quickly interact with the pharmacy computing system. The pharmacy computer will detect the pill dispenser 100 and its unique ID and will download any necessary data to the pill dispenser 100.

The cell-modem may also send SMS text messages to any outside source, for example, a user's family or friends, a caretaker, doctor, other healthcare provider, a researcher, pharmaceutical company, a pharmacy for refills, etc., as needed or desired.

When pill dispenser is returned to the pharmacy after use, the data recorded by the pill dispenser 100 that has not been sent to a central server may be uploaded to a pharmacy computer. The pharmacy database then may compile the data received from the pill dispenser 100 into a report to send to a doctor and/or a central database. The data compiled may include the information discussed above and also when the pill dispenser 100 was returned to the pharmacy.

The pill dispenser 100 may then be reset and reprogrammed with new data for a new user or a new prescription.

The pill dispenser 100 also contains a power source, such as a battery 408, to power the device. Preferably, the battery 408 is contained in dispensing section 118. However, the battery 408 may be located in other areas of the pill dispenser

100. Further, the pill dispenser 100 is not limited to a battery for power supply, but rather any power source may be used to power the pill dispenser 100.

The first embodiment discusses the use of two motors 410 and 412 to run the various components of the pill dispenser 100. As would be understood by one having ordinary skill in the art, since the motor 412 is running various components, the motor 412 includes a switchable transmission. Further, the invention is not limited to two motors. The invention could use a single motor with a transmission or any number of necessary or desired motors.

Figure 7:
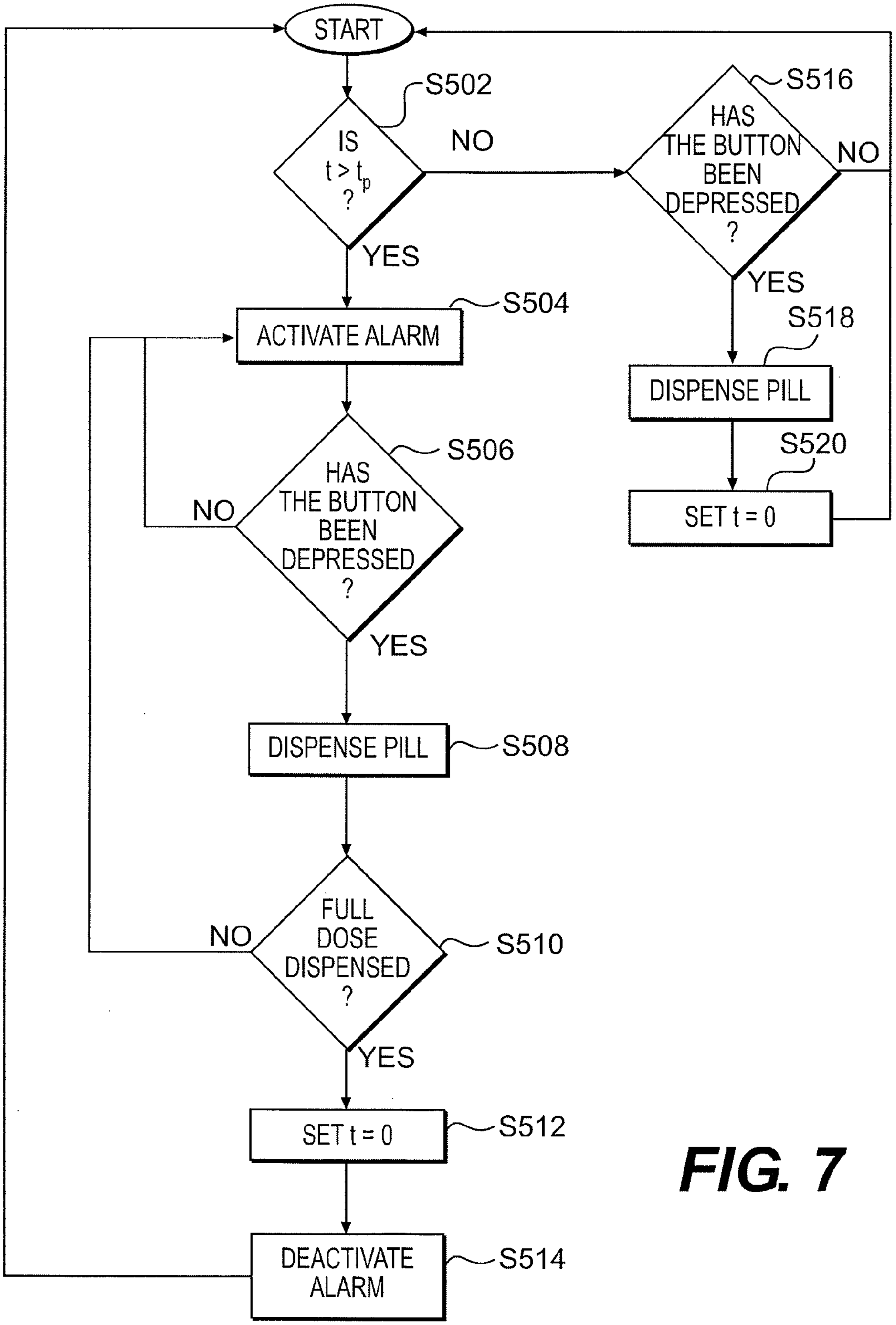
FIG. 7 is a flow chart illustrating a method of operation of the pill dispenser.

A process for determining when to indicate to a user it is time to take a pill is shown in FIG. 7. At step S502, the processing unit 402 determines if time has elapsed for the next dose of the medication as prescribed by the information stored in the database 404. More specifically, processing unit 402 determines if the elapsed time t is greater than a prescribed time interval $t_p$. If yes, the processing unit 402 activates an alert in step S504. Here, activating the alert means indicating to the user that it is time to take a pill. Deactivating the alert, mentioned below, signals to the user it is not yet time to take the pill. For ease of example, only a visual alarm will be described. If the prescribed time has elapsed, the alarm will flash a green light indicating to the user it is time to take a pill. If the prescribed time has not yet elapsed, the alarm will continue to flash a red light indicating to the user it is not yet time to take the next dose.

In step S506, when the alarm indicates to the user it is time to take the next dose, the user may press the button 102 to dispense a pill. If the user has depressed the button 102, then in step S508 the pill is dispensed, as discussed above.

In step S510, the processing unit 402 determines if the dose specification stored in the database 404 requires more than one pill. If yes, the processing unit 402 will return to step S504 and the alarm on the pill dispenser 100 will continue to alert the user that it is time to take a pill. The user may again press the button 102 and the above process will repeat, as shown in FIG. 7. If the correct dose has been dispensed, in step S512 the processing unit 402 will set the elapsed time t=0. In step S514, the alarm will be deactivated and the processing unit 402 will again begin monitoring the elapsed time t to determine if it is time for the user to take another pill based on the dose specifications stored in the database 404.

If the elapsed time t is not greater than the prescribed time interval in step S502, the processing unit 402 will continuously monitor whether the button 102 has been depressed in step S516. If not, the processing unit 402 will continue to monitor the time. If the button has been depressed in step S516, the pill will be dispensed in step S518 and the elapsed time t will be set to zero in step S520.

As discussed above in FIG. 7, if a user depresses the button 102 before the timer in the processing unit 402 has determined that it is time for the user to take the pill, the pill dispenser 100 will still dispense a pill and restart the timer when the pill is dispensed to begin a new calculation of a new time for the next dose. The database 404 will store the date and time the user dispenses the pill. Further, the pill dispenser 100 may send a message to an outside service if certain conditions are met, such as a predetermined number of pills are taken before the prescribed interval has elapsed, the removable top portion 104 is removed, there is a malfunction in the pill dispenser 100, or the prescribed number of pills has been dispensed. All of the various information is stored in the database 404 or in a memory (not shown) of the processing unit 402.

Figure 8:
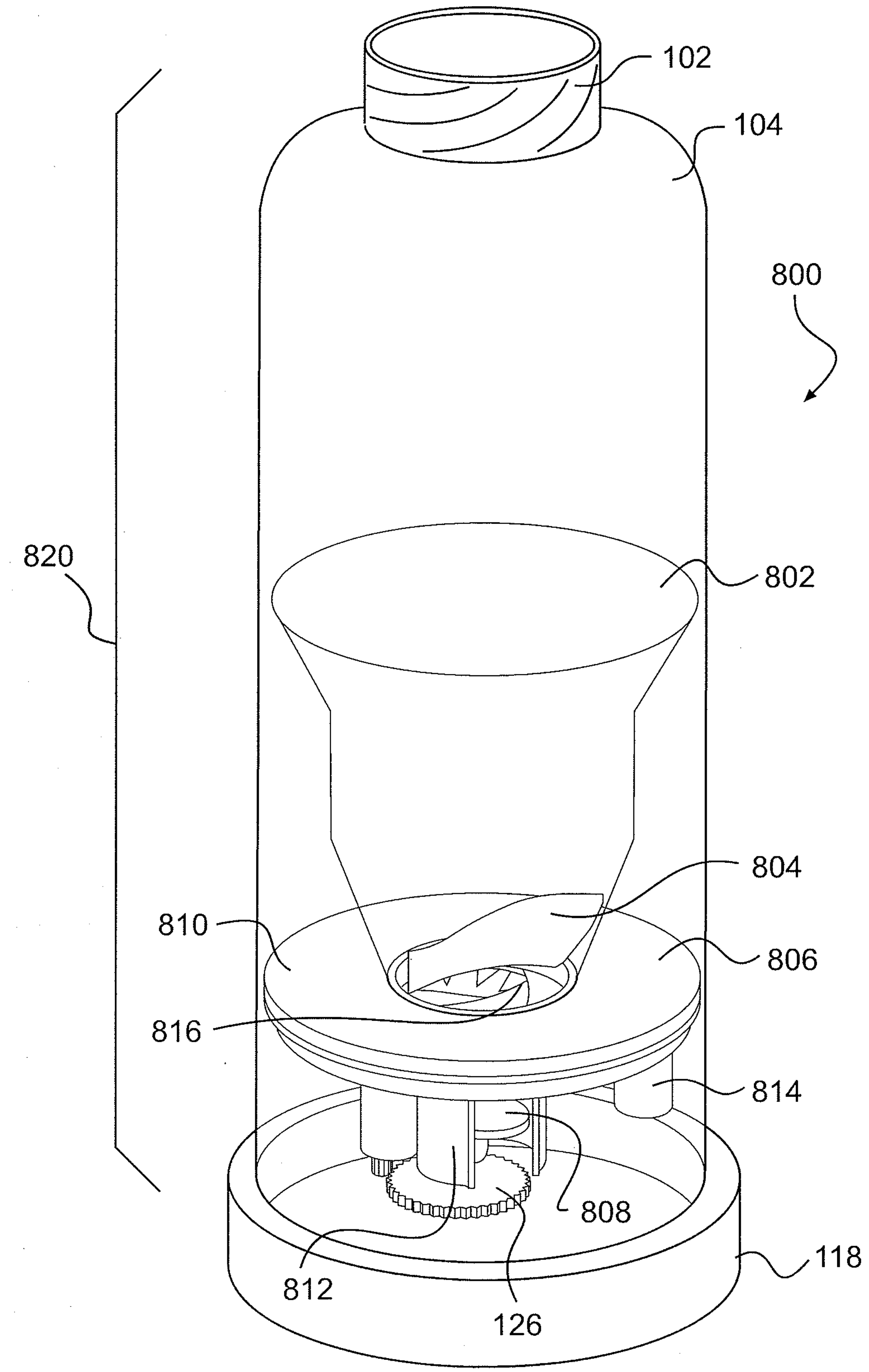
FIG. 8 is a perspective, transparent view showing internal features of a dispenser of a second embodiment of the present invention.

FIG. 8 is a cross-sectional perspective view showing the internal features of a pill dispenser 800 according to a second embodiment of the present invention. Similar elements of the pill dispensers 100 and 800 are given the same reference numerals as those in the first embodiment and their description will not be repeated. The pill dispenser 800 includes, for example, a removable top portion, container 106, and a pill dispensing assembly 820, as in the first embodiment. In this embodiment, the dispensing section 118 may have an opening such as that in the lower casing 118*b* of the first embodiment, or it may be a removable portion in order for the user to be able to access the dispensed pill. An enlarged view of the pill dispensing assembly 820 is provided in FIG. 9.

A funnel 802 is provided to help guide the pills to a dispensing mechanism of the pill dispenser 800. A rotating blade 804 is provided which rotates in order to guide the pills towards an inlet of the dispensing section. The rotating blade 804 helps place the pills in a vertical direction in order to enter a variable size opening 806.

Figure 9:
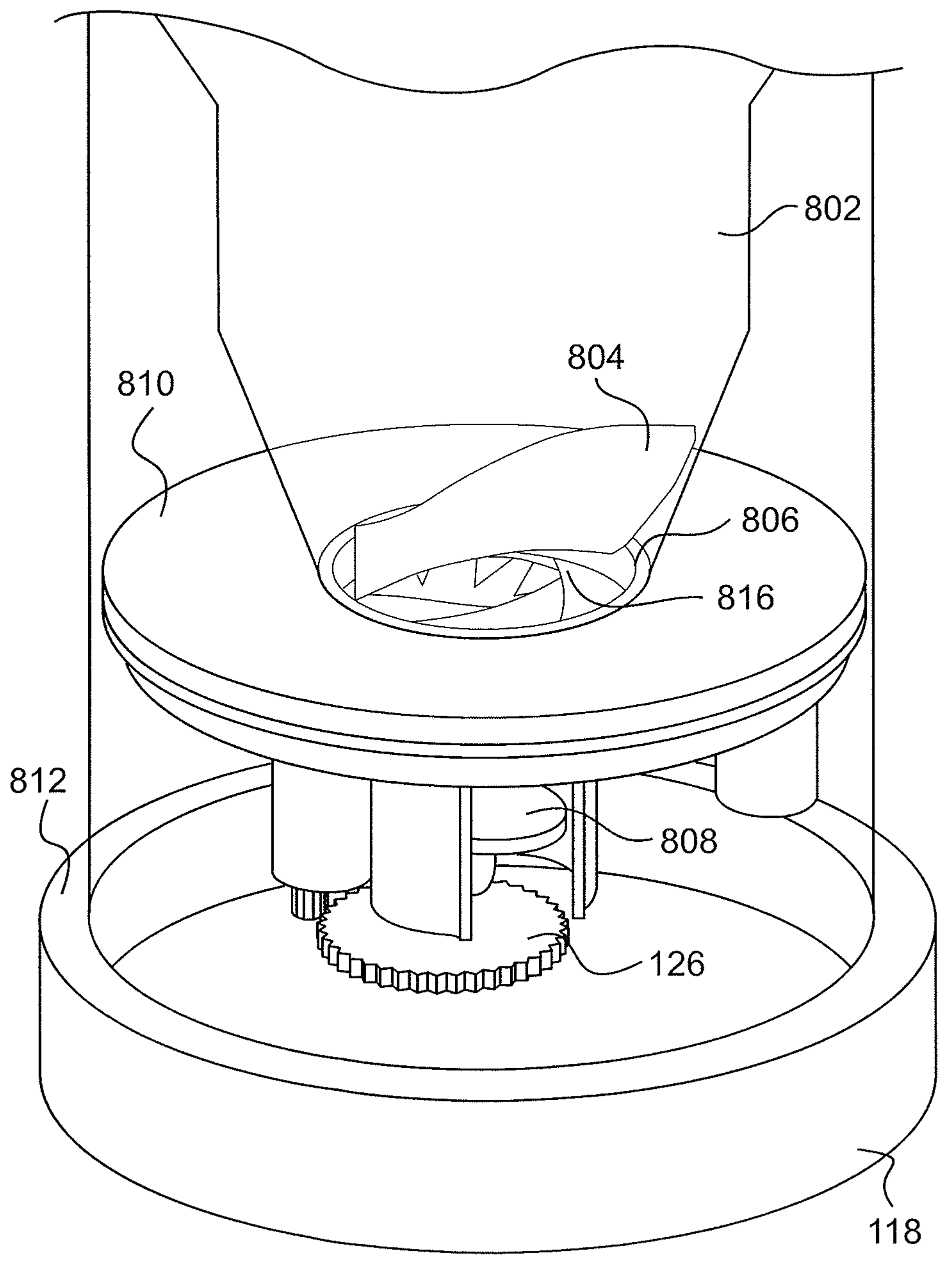
FIG. 9 is an enlarged view of the pill dispensing assembly of the pill dispenser shown in FIG. 8.

The variable size opening 806 and a seat 808 are adjusted for a particular pill during calibration, as is performed with respect to the first embodiment. The variable size opening 806 is adjusted by a plate assembly 810. The plates 816 in the plate assembly 810 are manipulated to adjust the size of opening 806 to equal the length or diameter of the pill. The plates 816 are adjusted to make the opening smaller or larger. That is, the plates 816 move relative to the left side of the pill dispenser 800, as seen in FIG. 9. The plate assembly 810 is somewhat similar to an iris diaphragm typically used in a traditional single reflex lens camera. Preferably, at least 5 plates 816 are provided in the plate assembly 810. The seat 808 is then adjusted upwards or downwards via a gear 126, to function similarly to the depth ring 116 in the first embodiment. The seat 808 will be set for the height of the pill. Therefore, if an incorrect pill that is placed in the pill dispenser 800 has a greater height than the pill that is intended to be dispensed, the pill will not be able to be dispensed.

Further, a pair of adjustable fences 812 are also adjusted during calibration to be the same size of the variable sized opening 806. The adjustable fences 812 are calibrated to grab a pill, of a specific size, that has come through the plate assembly 810 and is located on the seat 808. At this time, the plates 816 of the adjustable plate assembly 810 will close so that no other pills may come through the opening. The seat 808 is then adjusted downwards, and the adjustable fences 812 release a single pill. If the pill is not the correct size, the adjustable fences 812 will not be able to grab the pill. An optical sensor 306 can be placed in the dispensing section 118 to detect whether a pill has been dispensed.

The pill dispenser 800 utilizes a processing unit 402 similar to that in the first embodiment and operates in a similar manner. In the second embodiment, when the user presses the button, the rotating blade 804 begins rotating via a motor 814 to guide the pills to the pre-calibrated variable sized opening 806 and seat 808. The timing and dosage process are the same as that described in relation to the first embodiment.

Thus, there has been shown and described new and useful devices for dispensing pills to a user and determining if the user complies with the prescribed method of consumption. Although this invention has been exemplified for purposes of illustration and description by reference to certain specific embodiments, it will be apparent to those skilled in the art that various modifications, alterations, and equivalents of the illustrated examples are possible.

What is claimed is:

1. An apparatus for dispensing pills of various sizes, the apparatus comprising:

a storage section for storing pills to be dispensed;

a dispensing section connected to said storage section to dispense pills stored in said storage section through an outlet, said dispensing section including an adjusting device to adjust a variable size cavity for receiving from said storage section a pill to be dispensed and an ejecting device for ejecting the pill from the variable size cavity;

a controller for controlling said dispensing section; and a sensor to detect the pill to be dispensed, said sensor communicating with said controller, wherein said controller controls said adjusting device to adjust a size of the variable size cavity according to a size of the pill to be dispensed, controls said ejecting device to eject the pill from the variable size cavity, and receives a signal from the sensor when the pill has been successfully ejected from the variable size cavity, wherein said dispensing section defines the variable size cavity with a sizing ring, a movable dispensing ring, and a movable depth ring, and wherein said controller controls said dispensing section to position the movable dispensing ring at a predetermined rest position relative to the sizing ring in order to establish a maximum width of the variable size cavity, and to position the movable depth ring in a vertical direction to establish a depth of the variable size cavity.

2. The apparatus according to claim 1, wherein operation of said ejecting device comprises rotating the dispensing ring, relative to the sizing ring and the depth ring, to push the pill toward an opening in the depth ring to dispense the pill.

3. The apparatus according to claim 1, further comprising an alarm to provide an indication to a user at a time to take a pill and a memory storing prescribed dosing requirements for the pill and a last time medication was dispensed, wherein said controller controls said alarm based on the dosing requirements and the time stored in said memory.

4. The apparatus according to claim 3, wherein said controller controls said alarm to operate in one mode when said controller determines it is time for the user to take the pill and to operate in another mode at all other times.

5. The apparatus according to claim 4, wherein said alarm is at least one of an audio alarm, a visual alarm, and a vibrating alarm.

6. The apparatus according to claim 1, wherein said sensor is an optical sensor which optically detects physical properties of the pill.

7. The apparatus according to claim 6, further comprising an alarm and a memory storing specifications of physical properties of the pills, wherein when said controller determines that the physical properties of the pill detected by said sensor do not match the pill specification stored in said memory, said alarm alerts a user and/or another party.

8. The apparatus according to claim 7, wherein said memory further stores dosing requirements for the pills and the time medication was last dispensed and said controller controls said alarm based on the dosing requirements and time stored in said memory, and wherein when said controller determines that the physical properties of the pill detected by said sensor do not match the pill specification stored in said memory, said alarm alerts a user by emitting an alarm different from an alarm indicating to a user it is time to take a pill.

9. The apparatus according to claim 1, further comprising a memory storing prescribed dosing requirements for the pill and a communication device for communicating with a central database and providing information regarding compliance with the dosing requirements stored in said memory.

10. The apparatus according to claim 1, further comprising a ramp for guiding a pill to be dispensed from said storage section to said dispensing section, wherein the sizing ring further includes a protrusion configured as a backstop for the pill to be dispensed as the pill enters the dispensing ring from the ramp.

11. An apparatus for dispensing pills of various sizes, the apparatus comprising:

a storage section for storing pills to be dispensed;

a dispensing section connected to said storage section to dispense pills stored in said storage section through an outlet, said dispensing section including an adjusting device to adjust a variable size cavity for receiving from said storage section a pill to be dispensed and an ejecting device for ejecting the pill from the variable size cavity;

a controller for controlling said dispensing section;

a sensor to detect the pill to be dispensed, said sensor communicating with said controller;

a removable top portion covering said storage section;

another sensor to determine if the removable top portion has been removed from said storage section; and an actuator, located on said removable top portion, for beginning a dispensing process of the pill, wherein said controller controls said adjusting device to adjust a size of the variable size cavity according to a size of the pill to be dispensed, controls said ejecting device to eject the pill from the variable size cavity, and receives a signal from the sensor when the pill has been successfully ejected from the variable size cavity.

12. A method of operating a pill dispenser, comprising the steps of:

determining if an elapsed time is at least equal to a predetermined time period;

alerting a user when the elapsed time is at least equal to the predetermined time period;

determining whether the user has actuated the dispenser to release a pill from the pill dispenser; and releasing the pill from the pill dispenser if the dispenser has been activated, wherein said releasing step comprises positioning a pill to be dispensed in a dispensing cavity defined by a sizing ring, a dispensing ring and a depth ring set to a size of a specific pill, moving the dispensing ring relative to the sizing ring and the depth ring to move a single pill, and determining by a sensor that the pill has been dispensed.

13. The method of operating a pill dispenser according to claim 12, further comprising a step of initially calibrating a size of the cavity of the pill dispenser by: (i) adjusting a starting location of the dispensing ring relative to the sizing ring according to a specified pill size stored in a memory; and (ii) adjusting a height of the depth ring relative to the dispensing ring according to the specified pill size.

14. The method according to claim 12, wherein the user is alerted during said alerting step by an alarm including at least one of an audio alarm, a visual alarm, and a vibrating alarm.

15. The method according to claim 14, wherein the alarm operates in one mode when said determining step determines an elapsed time is at least equal to a predetermined time period and operates in another mode at all other times.

16. The method according to claim 12, wherein the sensor is an optical sensor which detects the physical properties of the pill.

17. The method according to claim 16, wherein said alerting step includes alerting a user by an alarm when the physical properties of the pill detected by the sensor do not match information stored in a memory, wherein the alarm alerts a user either by an audio alarm, a visual alarm or a vibrating alarm.

* * * * *